United States Patent [19]

Angevine et al.

[11] Patent Number: 4,696,732
[45] Date of Patent: Sep. 29, 1987

[54] SIMULTANEOUS HYDROTREATING AND DEWAXING OF PETROLEUM FEEDSTOCKS

[75] Inventors: Philip J. Angevine, Mantua; Yung F. Chu, Cherry Hill; Kenneth M. Mitchell, Mt. Laurel; Stephen M. Oleck, Moorestown; Stuart S. Shih, Cherry Hill; Robert C. Wilson, Jr., deceased, late of Woodbury, all of N.J., by Lillian S. Wilson, executrix

[73] Assignee: Mobil Oil Corporation, New York, N.Y.

[21] Appl. No.: 829,729

[22] Filed: Feb. 14, 1986

Related U.S. Application Data

[63] Continuation-in-part of Ser. No. 665,604, Oct. 29, 1984, Pat. No. 4,568,655, and a continuation-in-part of Ser. No. 665,605, Oct. 29, 1984, abandoned, and a continuation-in-part of Ser. No. 683,755, Dec. 19, 1984, abandoned, and a continuation-in-part of Ser. No. 783,399, Oct. 3, 1985, abandoned.

[51] Int. Cl.⁴ .................. C10G 45/08; C10G 45/12; C10G 45/64; C10G 47/20
[52] U.S. Cl. .................. 208/111; 208/216 PP; 208/251 H; 208/254 H
[58] Field of Search .................. 208/111, 120, 251 H, 208/254 H, 216 R, 216 PP

[56] References Cited

U.S. PATENT DOCUMENTS

| | | | |
|---|---|---|---|
| Re. 28,341 | 2/1975 | Wadlinger et al. | 208/120 |
| Re. 28,398 | 4/1975 | Chen et al. | 208/111 |
| 3,546,103 | 12/1970 | Hammer et al. | 208/111 |
| 3,668,113 | 6/1972 | Burbidge et al. | 208/97 |
| 3,702,818 | 11/1972 | Streed et al. | 208/89 |
| 3,702,886 | 11/1972 | Argauer et al. | 423/328 |
| 3,709,979 | 1/1973 | Chu | 423/328 |
| 3,755,138 | 8/1973 | Chen et al. | 208/33 |
| 3,755,145 | 8/1973 | Orkin | 208/111 |
| 3,832,449 | 8/1974 | Rosinski et al. | 423/328 |
| 3,894,938 | 7/1975 | Gorring et al. | 208/97 |
| 3,956,102 | 5/1976 | Chen et al. | 208/93 |
| 3,972,983 | 8/1976 | Ciric | 423/328 |
| 4,016,218 | 4/1977 | Haag et al. | 260/671 R |
| 4,016,245 | 4/1977 | Plank et al. | 423/328 |
| 4,046,859 | 9/1977 | Plank et al. | 423/328 |
| 4,076,842 | 2/1978 | Plank et al. | 423/328 |
| 4,089,774 | 5/1978 | Oleck et al. | 208/89 |
| 4,225,421 | 9/1980 | Hensley, Jr. et al. | 208/216 PP |
| 4,404,097 | 9/1983 | Angevine et al. | 208/210 |
| 4,411,770 | 10/1983 | Chen et al. | 208/111 |
| 4,419,220 | 12/1983 | La Pierre et al. | 208/111 |
| 4,428,819 | 1/1984 | Shu et al. | 208/46 |
| 4,430,200 | 2/1984 | Shihabi | 208/120 |
| 4,440,630 | 4/1984 | Oleck et al. | 208/111 |
| 4,456,700 | 6/1984 | Oleck et al. | 502/220 |
| 4,458,024 | 7/1984 | Oleck et al. | 502/66 |
| 4,510,044 | 4/1985 | Oleck et al. | 208/111 |
| 4,541,919 | 9/1985 | LaPierre et al. | 208/111 |

OTHER PUBLICATIONS

"Zeolite-Based Catalysts for Hydrocracking", by T. Yan, Ind. Eng. Chem. Process Des. Dev. 1983, 22, (pp. 154-160).

*Primary Examiner*—Olik Chaudhuri
*Attorney, Agent, or Firm*—Alexander J. McKillop; Michael G. Gilman; Malcolm D. Keen

[57] ABSTRACT

A process for simultaneously hydrotreating and dewaxing petroleum fractions is described. The process utilizes a single catalyst system which includes a hydrotreating component impregnated on a controlled pore size base and at least two catalyst components selected from any of an intermediate pore zeolite, a large pore zeolite or Zeolite Beta, and a large pore non-zeolite catalyst.

13 Claims, 3 Drawing Figures

Figure 3   Flow Diagram For Moderate-Pressure Hydrocracking Application

Figure 1  Flow Diagram For Desulfurization/Dewaxing Application

Figure 2   Flow Diagram For Pretreating Fcc Feed Application

Figure 3 Flow Diagram For Moderate-Pressure Hydrocracking Application

SIMULTANEOUS HYDROTREATING AND DEWAXING OF PETROLEUM FEEDSTOCKS

CROSS-REFERENCE TO RELATED PATENT APPLICATIONS

This application is a continuation-in-part of U.S. patent application Ser. No. 665,604, filed Oct. 29, 1984 in the name of Stephen M. Oleck et al, now U.S. Pat. No. 4,568,655; Ser. No. 665,605, filed Oct. 29, 1984 in the name of Philip J. Angevine et al, abandoned; Ser. No. 683,755, filed Dec. 19, 1984 in the name of Y. F. Chu et al, abandoned; and Ser. No. 783,399, filed Oct. 3, 1985 in the name of Stephen M. Oleck et al, abandoned, the disclosures of which are combined and incorporated herein by reference.

BACKGROUND OF THE INVENTION

1. Field of the Invention

This invention is directed to a combination catalyst having at least three difference catalyst components, and a process for using the same in a single stage operation for simultaneously hydrodewaxing and hydrotreating various petroleum residua.

2. Description of the Prior Art

Catalytic dewaxing of hydrocarbon oils to reduce the temperature at which separation of waxy hydrocarbons occurs is a known process. A process of that nature is described in *The Oil and Gas Journal*, dated Jan. 6, 1975, at pages 69–73. See also U.S. Pat. Nos. 3,668,113 and 3,894,938, which describe dewaxing followed by hydrofinishing.

U.S. Pat. No. Re. 28,398 describes a catalytic dewaxing process with a catalyst comprising a zeolite having a Constraint Index of 1 to 12. A hydrogenation/dehydrogenation component may be present.

A process for hydrodewaxing a gas oil with a zeolite having a Constraint Index of 1 to 12 is described in U.S. Pat. No. 3,956,102.

A Mordenite catalyst containing a Group VI or a Group VIII metal may be used to dewax a low viscosity index distillate from a waxy crude, as described in U.S. Pat. No. 4,110,056.

U.S. Pat. No. 3,755,138 describes a process for mild solvent dewaxing to remove high quality wax from a lube stock, which is then catalytically dewaxed to a specific pour point.

It is well known that many, if not most, petroleum base stocks contain contaminants, such as, for example, sulfur, nitrogen and metals. It is desirable, particularly if these feedstocks are to be further processed, that the contaminants be removed. This is an operation usually requiring the use of a catalyst. These feedstocks also usually contain waxy components which, because of the resultant high pour point, are difficult to pump and process. Thus, it is also desirable to reduce the amount of waxy component and to accordingly reduce the pour point of the feedstock.

It is well known in the art to effect sulfur removal from hydrocarbon stocks by subjecting them to treatment with hydrogen at elevated temperature and pressure while in contact with a catalyst containing hydrogenating components. Typically, the hydrogenating components of such prior art catalysts are Group IVA or Group VIII metals, or their oxides or sulfides. These hydrogenating components may be supported on a variety of well-known carriers, for example, alumina, kieselguhr, zeolitic molecular sieves and other materials having high surface areas; see in this regard U.S. Pat. No. 4,080,296. U.S. Pat. No. 3,546,103 teaches hydrodesulfurization with a catalyst which includes cobalt and molybdenum on an alumina base. U.S. Pat. No. 3,755,145 describes a process for preparing lube oils, characterized by low pour points, which utilizes a catalyst mixture comprising hydrogenationn components, a conventional cracking catalyst which can be either crystalline or amorphous and a crystalline aluminosilicate zeolite having a Constraint Index of 1 to 12.

U.S. Pat. No. 3,894,938 relates to the catalytic dewaxing and desulfurization of high pour point, high sulfur gas oils to lower their sulfur content by contacting such an oil with a ZSM-5 type zeolite hydrodewaxing catalyst having a Constraint Index of 1 to 12, which may contain a hydrogenation/dehydrogenation component, in the presence or absence of added hydrogen, followed by conventional hydrodesulfurization processing of the dewaxed intermediate.

Co-pending application Ser. No. 310,550, filed Oct. 13, 1981, discloses and claims a single stage operation for hydrotreating and hydrodewaxing petroleum residua using a dual catalyst system; that is, a hydrodesulfurization catalyst combined with a metal-containing ZSM-5 hydrodewaxing catalyst. This patent is hereby incorporated by reference.

U.S. Pat. No. 4,440,630 relates to a single stage catalyst system and process for using the system in a single stage operation for hydrodewaxing and hydrotreating petroleum residua. The catalyst comprises a ZSM-5 type zeolite in alumina binder having specified metal content and pore volume characteristics. This patent is hereby incorporated by reference.

U.S. Pat. Nos. 4,456,700 and 4,458,024 relate to a process for hydrodewaxing and hydrotreating petroleum residua to more valuable products. The catalyst system described in U.S. Pat. No. 4,458,024 includes a zeolite having a Constraint Index of 1 to 12, an alumina binder, at least one Group VIII metal selected from nickel, cobalt and iron, and at least one Group VIB metal. The catalyst is characterized by specific metals content and pore volume features. A related development is described in co-pending application Ser. No. 307,555, filed Oct. 1, 1981.

U.S. Pat. No. 4,225,421 describes a process for hydrodemetallation and hydrodesulfurization of a hydrocarbon feedstock containing asphaltenes and metals by contacting the feedstock with hydrogen and a bimodal catalyst which contains at least one metal, e.g., molybdenum, chromium and tungsten.

U.S. Pat. No. 4,411,770 describes a process for the hydroconversion of heavy hydrocarbon oils, wherein the catalyst comprises a crystalline zeolite component and a metallic hydrogenation component. The zeolites taught as being useful in this process include zeolites having a Constraint Index of 1 to 12 and Zeolite Beta.

Co-pending application Ser. No. 379,421, filed May 18, 1982, discloses a process and catalyst for simultaneously hydrocracking and dewaxing heavy hydrocarbon oils, such as vacuum gas oil. The catalyst system utilized is described as including 10 to 99 wt %, preferably 25 to 80 wt % Zeolite Beta, a porous matrix material, such as alumina, and a hydrogenation component derived from one or more metals of Groups VB, VIB or VIIIB of the Periodic Table (the Periodic Table referred to herein is the Table approved by IUPAC and the U.S. National Bureau of Standards, and is shown, for example, in the Table of the Fisher Scientific Company, Catalog No. 5-702-10, and is the Table of reference for this application).

U.S. Pat. No. 4,452,691 relates to a process for upgrading heavy oil to fuel products, comprising deasphalting the heavy oil with an oxygenated solvent and simultaneously converting the oxygenated solvent and deasphalted oil over a ZSM-5 type catalyst to produce gasoline and distillate boiling range hydrocarbons. The patent is hereby incorporated by reference.

An article, T. Y. Yan, *Zeolite Based Catalyst for Hydrocracking*, Ind. Eng. Chem. Process Des. Dev., 22, 154-160 (1983), relates to a zeolite/amorphous dual catalyst system developed for hydrocracked feeds with wide boiling range, in which the zeolite and amorphous catalyst operate complementally. The article is hereby incorporated by reference.

However, the prior art mentioned above has not combined, in a single stage operation, the hydrodewaxing and hydrotreating of petroleum resids using a catalyst, as described below, having at least three catalytic components, particularly to upgrade petroleum products to have fractions having pour points less than about 20° F. and to have kinematic viscosity less than about 500 centistokes.

OBJECTS OF THE INVENTION

It is thus an object of the present invention to provide a process for simultaneously hydrotreating and hydrodewaxing a petroleum feedstock.

It is further an object of the present invention to provide a process for simultaneously catalytically hydrodesulfurizing and hydrodewaxing a petroleum residual oil and other suitable petroleum base stock, comprising reacting a mixture of hydrogen and the residual oil under hydrodesulfurizing/hydrodewaxing conditions with a catalyst comprising a composite of at least three catalytic components.

It is further an object of the present invention to provide a process for simultaneously hydrotreating and dewaxing distillable petroleum fraction having an initial sulfur content of at least 1.0 wt% and a boiling point in the range of 500° to 1050° F. (260°-565° C.).

It is further an object of the present invention to provide a process for hydrotreating, demetallizing and dewaxing a petroleum residua, at least 50% of which boils above 750° F. (399° C.).

It is also an object of the present invention to provide a combination catalyst for simultaneously catalytically hydrodesulfurizing and hydrodewaxing a petroleum residual oil.

These objects and others are provided in this application, the disclosure of which follows.

SUMMARY OF THE INVENTION

The present invention is directed to a process for simultaneous catalytically hydrodesulfurizing and hydrodewaxing a petroleum residual oil and other suitable petroleum base stock, comprising contacting a mixture of hydrogen and the residual oil under hydrodesulfurizing/hydrodewaxing condition with a composite catalyst containing a hydrotreating component supported on an alumina binder, and at least two other crystalline silicates selected from the group consisting of an intermediate pore zeolite, a large pore zeolite and a large pore non-zeolite; and recovering an upgraded petroleum product characterized by fractions having pour points less than 20° F. and by kinematic viscosity less than about 500 centistokes.

The present invention is also directed to a combination catalyst for simultaneously catalytically hydrodesulfurizing and hydrodewaxing a petroleum residual oil, and other suitable petroleum base stock, comprising a composite of a hydrotreating component supported on a controlled pore-size alumina binder and at least two other crystalline silicates selected from the group consisting of an intermediate pore zeolite, a large pore zeolite and a large pore non-zeolitic inorganic binder.

The present invention is further directed to a single catalyst system capable of simultaneously demetallizing, hydrotreating and hydrodewaxing petroleum residua in a single stage process. The catalyst system of the present invention includes one or more Group VIB or Group VIII metals, or their oxides or sulfides, or mixtures thereof, impregnated on a base comprising Zeolite Beta admixed with one or more inorganic oxides.

The present invention is also directed to a process for simultaneously hydrotreating and dewaxing distillable petroleum fractions having an initial sulfur content of at least 1.0 wt % and a boiling point in the range of 500° to 1050° F., which process comprises contacting the fractions with a catalyst comprising:

a base component, including 0.5 to 30 wt % Zeolite Beta and 70 to 99.5 wt % of an inorganic oxide material, based on the combined weight of the Zeolite Beta and inorganic oxide materials; and a hydrogenation/dehydrogenation component supported on the base component, said hydrogenation/dehydrogenation component including 6 to 25 wt %, based on total catalyst weight and expressed in elemental form, of at least one Group VIII metal selected from iron, cobalt and nickel, and at least one Group VIB metal, said process resulting in conversion of less than 15% of the fractions to lighter materials.

DESCRIPTION OF PREFERRED EMBODIMENTS

This invention relates to composite catalysts containing hydrotreating components supported on ZSM-5 and Zeolite Beta and an appropriate binder. The composite catalyst is useful in a resid and heavy oil desulfurizer at moderate pressure to increase total yield. The components of the composite catalyst are known in the art. However, their particular combination is unknown.

The present invention is generally directed to hydrotreating and hydrodewaxing heavy hydrocarbon feedstocks which contain asphaltenes, metals, nitrogen compounds, sulfur compounds and waxy components. More specifically, the process is directed to treating feedstocks that contain amounts of metal, e.g., from about 30 ppm to about 1000 ppm of nickel and vanadium. Generally, the catalyst of the present invention is most useful for processing stocks that contain less than about 300 ppm metals, and preferably less than about 125 to 150 ppm metals. When the feedstock contains a very large amount of metal, the feedstock may have to be treated in a two-stage system, wherein a demetallation catalyst is used in the first stage to provide partially demetallated feed to the second stage for contact with the catalyst of the present invention to remove the remaining metals, sulfur and waxy components.

Catalyst

The catalysts of the present invention are especially useful in a process for hydrodemetallation, hydrodesulfurization and dewaxing of a hydrocarbon feedstock containing asphaltenes, metals and waxy components, such as, e.g., petroleum residua, by contacting the feedstock with hydrogen, and a catalyst containing at least one active hydrogenation catalyst selected from Groups VIB or VIII of the Periodic Table and deposited on a support comprising at least two components of the following list: an intermediate pore zeolite; a large pore zeolite or Zeolite Beta; and a very large pore non-zeolite.

The catalysts of the present invention are also useful for residua hydrodesulfurization units where demetallation is not a major concern, yielding a low sulfur product with increased distillate yield. They are also highly useful with heavy stocks, such as atmospheric and vacuum residua, as well as distillates which are difficult to hydrodewax with conventional catalysts.

The catalysts embodied herein can be prepared in any conventional manner known to the art. Preferred are catalysts in which the metal components are nickel, cobalt, tungsten and molybdenum, or mixtures thereof, and, in particular, a mixture of nickel oxide and molybdenum oxide, i.e., NiO and $MoO_3$, which is well known in the catalytic art. Accordingly, their preparation forms no part of this invention. The base preferably includes Zeolite Beta, optimally in combination with a crystalline silicate zeolite of the type described below, and at least one inorganic oxide, preferably alumina.

Hydrotreating Catalyst

The catalyst system of the present invention includes a hydrotreating or hydrogenation/dehydrogenation component which is impregnated on a base comprising one or more inorganic oxides. The hydrogenation/dehydrogenation component utilized comprises one or more metals selected from one of three groups of the Periodic Table: Group VIB metals, base metals from Group VIII and noble metals from Group VIII. The preferred Group VIII metals include iron, nickel and cobalt, with nickel and cobalt being especially preferred. The preferred Group VIB metals include tungsten and molybdenum and mixtures of these two elements. The noble metals of Group VIII, e.g., palladium and platinum, are considerably less effective in desulfurizing and denitrogenating the petroleum residua feedstocks treated with the catalyst of the present invention. Moreover, these metals are more expensive and more readily subject to poisoning than are iron, nickel and cobalt. Thus, the non-noble metals of Group VIII and the Group VIB metals are preferred to the noble metals thereof as a hydrogenation/dehydrogenation component in the present catalyst system. Although noble metals may, in theory, be useful in the catalyst system in the present invention, it is currently believed that in the practical applications envisioned for the present invention, the overall effectiveness of catalyst systems containing non-noble metals will be much greater. Accordingly, the following description relating to the metals content and, more specifically, the Group VIII metals content of the present catalyst system, is oriented toward the use of non-noble metals from Group VIII. It should be understood that the content of the noble metal in percent by weight would be considerably lower than the ranges set forth below for non-noble metals; a range of from about 0.1 to about 5 wt % has been found to be suitable for the noble metals.

The Group VIB and Group VIII metals content of the present catalyst system range from about 2 to about 10% of Group VIII metal and from about 2 to about 25% of Group VIB metal. The preferred amount of Group VIII metal in elemental form is between about 2 and about 10%. The preferred amount of Group VIB metal in elemental form is between 5 and about 20%. The foregoing amounts of metal components are given in percent by weight of the catalyst on a dry basis.

The base on which the Group VIB or Group VIII metals, metal oxides or sulfides are impregnated comprises an inorganic oxide, such as alumina or silica, for example, or mixtures of inorganic oxides.

A preferred version of the catalyst of the present invention should have a particular bimodal pore size distribution. In this connection, it is highly desirable that the catalyst have a total pore volume of from about 0.4 cc/g to about 1.0 cc/g. It is also desirable to have about 75% of the catalyst pore volume being less than about 100 Angstrom (A) units in diameter, about 20% of its pore volume greater than about 300 A in diameter, and less than about 8% of the pore volume between about 100 and 300 A in diameter.

The aforementioned range of pore volumes advantageously gives the catalyst a unique combination of functions. Unlike the catalysts of the prior art, the catalyst of the present invention has a considerable number of pores of volume less than 100 A in diameter, which accommodates the desulfurization reaction, and significant number of pores larger than 300 A in diameter, which is useful for demetallation.

Zeolite

For purposes of this invention, the term "zeolite" is meant to represent the class of porotectosilicates, i.e., porous crystalline silicates, that contain silicon and oxygen atoms as the major components. Other components may be present in minor amounts, usually less than 14 mole %, and preferably less than 4 mole %. These components include aluminum, gallium, iron, boron, scandium, titanium and the like, with aluminum being preferred, and used herein for illustration purposes. The minor components may be present separately or in mixtures.

The silica-to-alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica-to-alumina mole ratio of at least 8 are useful, it is preferred to use zeolite having much higher silica-to-alumina mole ratios, i.e., ratios of at least 20:1. In addition, zeolites, as otherwise characterized herein but which are substantially free of aluminum, i.e., having silica-to-alumina mole ratios up to and including infinity, are found to be useful and even preferable in some instances. A more detailed description of a silica/alumina ratio is presented in the section entitled Zeolite Beta following. The novel class of zeolites, after activation, acquire an intra-crystalline sorption affinity for normal hexane, whichis greater than that for water, i.e., they exhibit "hydrophobic" properties.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g., less than 5 Angstroms. On the other hand, zeolites which provide relatively free access to the internal zeolite structure have a low value for the Constraint Index, and usually pores of large size, e.g., greater than 8 Angstroms. The method by which Constraint Index is determined is described fully in U.S. Pat. No. 4,016,218, incorporated herein by reference for details of the method.

Constraint Index (CI) values for some typical materials are:

|  | CI | (At Test Temperature) |
| --- | --- | --- |
| ZSM-4 | 0.5 | 316° C. |
| ZSM-5 | 6–8.3 | (371°–316° C.) |
| ZSM-11 | 6–8.7 | (371°–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-Alumina | 0.6 | (538° C.) |
| Dealuminized Y (Deal Y) | 0.5 | (510° C.) |
| Erionite | 38 | (316° C.) |
| Zeolite Beta | 0.6–2 | (316°–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for zeolites, such as ZSM-5, ZSM-11 and Zeolite Beta.

Zeolite ZSM-4 is taught by U.S. Pat. No. 3,923,639, the disclosure of which is incorporated herein by reference.

Zeolite ZSM-5 is taught by U.S. Pat. Nos. 3,702,886, and Re. 28,847, the disclosures of which are incorporated herein by reference.

Zeolite ZSM-11 is taught by U.S. Pat. No. 3,709,979, the disclosure of which is incorporated herein by reference.

Zeolite ZSM-12 is taught by U.S. Pat. No. 3,832,449, the disclosure of which is incorporated herein by reference.

Zeolite ZSM-18 is taught by U.S. Pat. No. 3,950,496, the disclosure of which is incorporated herein by reference.

Zeolite ZSM-20 is taught by U.S. Pat. No. 3,972,983, the disclosure of which is incorporated herein by reference.

Zeolite ZSM-23 is taught by U.S. Pat. No. 4,076,342, the disclosure of which is incorporated herein by reference.

Zeolite ZSM-34 is taught by U.S. Pat. No. 4,086,186, the disclosure of which is incorporated herein by reference.

Zeolite ZSM-35 is a synthetic ferrierite-type material described by U.S. Pat. No. 4,016,245, the disclosure of which is incorporated herein by reference.

Zeolite ZSM-38 is a synthetic ferrierite-type material described in U.S. Pat. No. 4,046,859, the disclosure of which is incorporated herein by reference.

Zeolite ZSM-48 is taught by U.S. Pat. No. 4,397,827, the disclosure of which is incorporated herein by reference.

Zeolite Beta is taught by U.S. Pat. Nos. 3,308,069 and Re. 28,341, the disclosures of which are incorporated herein by reference.

U.S. patent application Ser. No. 386,456 to Valyocsik dated June 8, 1982, which is incorporated herein by reference, discloses a synthetic porous crystalline material designated as zeolite ZSM-50, a method for its preparation and to its use in catalytic conversion of organic compounds.

Low sodium Ultrastable Y molecular sieve (USY) is described in U.S. Pat. Nos. 3,293,192 and 3,449,070, the disclosures of which are incorporated herein by reference.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of 555° to 1000° F. (290°–538° C.), with accompanying conversion between 10 and 60%, the CI may vary within the indicated range of 1 to 12. Likewise, other variables such as the crystal size of the zeolite, the presence of possibly occluded contaminants and binders intimately combined with the zeolite may affect the CI. it will accordingly be understood to those skilled in the art that the CI, as utilized herein, while affording a highly useful means for characterizing the zeolites of interest, is approximate, taking into consideration the manner of its determination, with the possibility, in some instances, of compounding variable extremes. However, in all instances, at a temperature within the above-specified range of 555° to 1000° F. (290°–538° C.), the CI will have a value for any given zeolite of interest herein within the approximate range of 1 to 12.

Intermediate Pore Zeolites

Medium or intermediate pore zeolites have a Constraint Index generally between 1 and 12, and an effective pore size of generally not greater than about 7

Angstroms, such as to freely sorb normal hexane. By "effective pore size", it is meant that the pores of the medium pore zeolite behave in the same fashion as perfectly cylindrical pores, generally less than 7 Angstroms in size. Thus, a medium pore zeolite may have pores in excess of 7 Angstroms in size as long as the shape of the pores renders an effective pore size no greater than 7 Angstroms in size. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA Offretite does show some constrained access. Other 12-ring structures may exist which may be operative for other reasons, and therefore it is not the present intention to entirely judge the usefulness of a particular zeolite solely from theoretical structural considerations.

Natural zeolites may sometimes be converted to this type zeolite by various activation procedures and other treatments, such as base-exchange, steaming, alumina extraction and calcination, optimally in combinations. Natural minerals which may be so treated include ferrierite, brewsterite, stilbite, dachiardite, epistibite, heulandite and clinoptilolite.

The preferred medium pore zeolites in this invention include those having the structure of ZSM-5, ZSM-11, ZSM-12, ZSM-22, ZSM-23, ZSM-34, ZSM-35, ZSM-38, ZSM-48, ZSM-50, TMA Offretite and Erionite, with ZSM-5 being particularly preferred.

It may be desirable to incorporate the catalyst in another material resistant to the temperature and other conditions employed in the process. Such matrix materials include synthetic and naturally occurring substances, such as inorganic material, e.g., clay, silica and metal oxides. The latter may be either naturally occurring or in the form of gelatinous precipitates or gels, including mixtures of silica and metal oxides. Naturally occurring clays can be composited with the zeolite, including those of the montmorillonite and kaolin families. The clays can be used in the raw state as originally mined or initially subjected to calcination, acid treatment or chemical modification.

Large Pore Zeolites

The large pore zeolites, i.e., those zeolites having a Constraint Index less than 2, are well known to the art and have a pore size sufficiently large to admit the vast majority of components normally found in a feed chargestock. The zeolites are generally stated to have a pore size in excess of 7 Angstroms and are represented by, e.g., Zeolie L, Zeolite Y, Ultrastable Y (USY), Dealuminized Y (Deal Y), Mordenite, ZSM-3, ZSM-4, ZSM-18 and ZSM-20.

Zeolite Beta

An exceptionally suitable large pore material is Zeolite Beta. It is noted that Zeolite Beta does not have the same structure as the other listed large pore zeolites.

Zeolite Beta is described in U.S. Pat. Nos. 3,308,069 and Re. 28,341, the entire contents of which are incorporated herein by reference. Zeolite Beta is a crystalline silicate zeolite having a pore size greater than 5 Angstroms. The composition of the zeolite in its as-synthesized form may be expressed as follows:

where X is less than 1, preferably less than 0.75; TEA represents the tetraethylammonium ion; Y is greater than 5, but less than 100, and W is up to about 60 (it has been found that the degree of hydration may be higher than originally determined, where W was defined as being up to 4), depending on the degree of hydration and the metal cation present. The TEA component is calculated by differences from the analyzed value of sodium and the theoretical cation to structural aluminum ratio of unity.

In the fully base-exchanged form, Zeolite Beta has the composition:

where X, Y and W have the values listed above and n is the valence of the metal M. As it is now more conventional to refer to the silica:alumina ratio of zeolites rather than to the silicon:aluminum ratio thereof, it should be noted that the foregoing formula may also be expressed as:

where Y, which determines the silica:alumina ratio, is greater than 10. Thus, the numerical value of ratios expressed as "silica:alumina" will always be twice as great as the corresponding silicon:aluminum ratio of the zeolite. For example, a silicon:aluminum ratio of 100:1 corresponds to a silica:alumina ratio of 200:1. The ratios relating the Zeolite Beta referred to throughout the remainder of this description are expressed as silica:alumina.

In the partly base-exchanged form which is obtained from the initial sodium form of the zeolite by ion-exchange without calcining, Zeolite Beta has the formula:

It is normally preferred to use the zeolite in a form which has sufficient acidic functionality to give it an alpha value of 1 or more. The alpha value, a measure of zeolite acidic functionality, is described, together with details of its measurement, in U.S. Pat. No. 4,016,218 and in *J. Catalysis,* Vol. VI, pages 278–287 (1966) and reference is made to these for such details. The acidic functionality may be controlled by base-exchange of the zeolite, especially with alkali metal cations, such as sodium, by steaming, by control of the silica:alumina ratio of the zeolite, or by acid extraction of aluminum from the zeolite. Although not wishing to restrict the present invention to the use of Zeolite Beta, for the purposes of describing the present invention Zeolite Beta will be used.

When synthesized in the alkali metal form, Zeolite Beta may be converted to the hydrogen form by formation of the intermediate ammonium form as a result of ammonium ion-exchange and calcination of the ammonium form to yield the hydrogen form. In addition to the hydrogen form, other forms of the zeolite, wherein the original alkali metal has been reduced, may be used. Thus, the original alkali metal of the zeolite may be replaced by ion-exchange with other suitable metal cations, including, by way of example, platinum, nickel, copper, zinc, palladium, calcium or rare earth metals.

Zeolite Beta, in addition to possessing a composition as defined above, may also be characterized by its X-ray diffraction data, which are set out in U.S. Pat. Nos. 3,308,069 and Re. 28,341. The significant d values (Angstroms, radiation: K alpha doublet of copper, Geiger counter spectrometer) are as shown in Table 1 below:

TABLE 1

| d Values of Reflections in Zeolite Beta |
| --- |
| 11.4 ± 0.2 |
| 7.4 ± 0.2 |
| 6.7 ± 0.2 |
| 4.25 ± 0.1 |
| 3.97 ± 0.1 |
| 3.0 ± 0.1 |
| 2.2 ± 0.1 |

It has been found that Zeolite Beta may be prepared with silica:alumina ratios above the 200:1 maximum specified in U.S. Pat. Nos. 3,308,069 and Re. 28,341. More specifically, ratios of at least 50:1, at least 100:1 or even higher, e.g., 250:1, 500:1, may be obtained.

The silica:alumina ratios referred to in this specification are the structural or framework ratios, that is, the ratio of the $SiO_4$ to the $AlO_4$ tetrahedra, which together constitute the structure of which the zeolite is composed. It should be understood that this ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by the thermogravimetric analysis (TGA) of ammonia desorption, a low ammonia titration may be obtained if the cationic aluminum prevents exchange of the ammonium ions onto the acidic sites. These disparities are particularly troublesome when certain treatments, such as the dealuminization method described below which result in the presence of ionic aluminum free of the zeolite structure, are employed. Due care should therefore be taken to ensure that the framework silica:alumina ratio is correctly determined.

The silica:alumina ratio of the zeolite may be determined by the nature of the starting materials used in its preparation and their quantities relative one to another. Some variation in the ratio may therefore be obtained by changing the relative concentration of the silica precursor relative to the alumina precursor, but definite limits in the maximum obtainable silica:alumina ratio of the zeolite may be observed. For Zeolite Beta, this limit is usually about 200:1 (although higher ratios may be obtained), and for ratios above this value, other methods are usually necessary for preparing the desired high silica zeolite. One such method comprises dealuminization by extraction with acid, and this method is disclosed in detail in U.S. patent application Ser. No. 379,399, filed May 18, 1982 by R. B. LaPierre and S. S. Wong, entitled "High Silica Zeolite Beta", and reference is made to this application for additional details of the method.

Briefly, the method comprises contacting the zeolite with an acid, preferably a mineral acid such as hydrochloric acid. The dealuminization proceeds readily at ambient and mildly elevated temperatures and occurs with minimal losses in crystallinity to form high silica forms of Zeolite Beta with silica:alumina ratios of 200:1, or even higher, being readily obtainable.

The zeolite is conveniently used in the hydrogen form for the dealuminization process, although other cationic forms may also be employed, for example, the sodium form. If these other forms are used, sufficient acid should be employed to allow for the replacement by protons of the original cations in the zeolite. The amount of zeolite in the zeolite/acid mixture should generally be from 5 to 60% by weight.

The acid may be a mineral acid, i.e., an inorganic acid or an organic acid. Typical inorganic acids which can be employed include mineral acids, such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level, which could affect the crystallinity of the zeolite undergoing treatment. The acidity which the zeolite can tolerate will depend, at least in part, upon the silica:alumina ratio of the starting material. Generally, it has been found that Zeolite Beta can withstand concentrated acid without undue loss in crystallinity, but as a general rule, the acid will be from 0.1N to 4.0N, usually 1 to 2N. These values hold good regardless of the silica:alumina ratio of the Zeolite Beta starting material. Stronger acids tend to effect a relatively greater degree of aluminum removal than weaker acids.

The dealuminization reaction proceeds readily at ambient temperatures, but mildly elevated temperatures may be employed, e.g., up to 212° F. (100° C.). The duration of the extraction will affect the silica:alumina ratio of the product, since extraction, being diffusion controlled, is time dependent. However, because the zeolite becomes progressively more resistant to loss of crystallinity as the silica:alumina ratio increases, i.e., it becomes more stable as the aluminum is removed, higher temperatures and more concentrated acids may be used towards the end of the treatment than at the beginning, without the attendant risk of losing crystallinity.

After the extraction treatment, the product is water-washed free of impurities, preferably with distilled water, until the effluent wash water has a pH within the approximate range of 5 to 8.

The crystalline dealuminized products obtained by this method have substantially the same crystallographic structure as that of the starting aluminisilicate zeolite, but with increased silica:alumina ratios. The formula of the dealuminized Zeolite Beta will therefore be:

$$\left[\frac{x}{n} M(1.0 \pm 0.1 - X)H\right] \cdot Al_2O_3 \cdot YSiO_2 \cdot WH_2O$$

where X is less than 1, preferably less than 0.75, Y is at least 100, preferably at least 150, and W is up to 60. M is a metal, preferably a transition metal or a metal of Groups IA, IIA or IIIA, or a mixture of metals. The silica:alumina ratio, Y, will generally be in the range of 100:1 to 500:1, more usually 150:1 to 300:1, e.g., 200:1 or more. The X-ray diffraction pattern of the dealuminized zeolite will be substantially the same as that of the original zeolite, as set out in Table 1 above.

If desired, the zeolite may be steamed prior to acid extraction so as to increase the silica:alumina ratio and render the zeolite more stable to the acid. The steaming may also serve to increase the ease with which the acid is removed and to promote the retention of crystallinity during the extraction procedure.

Non-Zeolite Catalyst Component

The inorganic oxide utilized in the base of the present catalyst system may include large pore non-zeolites having a pore size greater than 8.5 Angstroms, such as alumina, silica, and mixtures of silica and alumina (silica-alumina), as well as mixtures of other inorganic oxides, such as silica-magnesia, silica-zirconia, silica-thoria, silica-beryllia, silica-titania, silica-alumina-thoria, silica-alumina-zirconia, silica-alumina-magnesia, and silica-magnesia-zirconia. The inorganic oxide may also comprise naturally occurring clays, such as those of the montmorillonite and kaolin families, which families include the subbentonites and the kaolins commonly known as Dixie, McNamee-Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

A preferred inorganic oxide is alumina. As is well known by those skilled in the art, the characteristic of composited alumina catalysts depends to a very large extent on the properties of the alumina. An alumina possessing characteristics which are eminently suitable for preparation of the novel catalyst of this invention is one manufactured by Conoco Chemical Company, under their tradename Catapal SB, in the form of alpha-alumina monohydrate powder. Other commercial alpha-alumina monohydrate powders, such as supplied by Kaiser and American Cyanamid, can be used.

Catalyst Preparation

This section describes various catalyst preparation procedures. It is noted that while these descriptions utilize Zeolite Beta, an inorganic oxide and a hydrotreating component in the catalyst composite, other components within the present invention can readily be substituted. This will become apparent in the Examples.

The novel catalyst of this invention may be prepared, when a combination of a Group VIII and Group VIB metal is desired, by mixing Zeolite Beta with a suitable inorganic oxide, such as Catapal SB alumina, followed by extruding, calcining, exchanging to low sodium content, drying, impregnating with a Group VIB metal salt solution, drying, impregnating with a Group VIII metal salt solution, and re-calcining. Other methods can be employed to prepare the catalyst of this invention, such as mixmulling of the Zeolite Beta, inorganic oxide support and hydrogenation/dehydrogenation component, followed by extruding and calcining. The extrudate then may be exchanged to low sodium, dried and re-calcined. The exchange would be unnecessary if the Zeolite Beta is exchanged to low sodium prior to blending with the alumina for extrusion. (This procedure was used in Example 2.)

Process Conditions

Typical process conditions utilized in carrying out the novel process of this invention include a hydrogen pressure of about 200 to 3000 psig, a temperature of about 600° to 900° F. (315°–482° C.), and a liquid hourly space velocity (LHSV) of 0.1 to 10, based on the total complement of catalyst in the system.

Feedstock

The novel catalyst system of the present invention is effective in treating petroleum residua to reduce the metal, sulfur and Conradson Carbon Residue (CCR) content of the residua, as well as reducing its pour point. In general, the residua which may be most effectively treated with the catalyst and process of the present invention are those having properties such that at least 50% of the residua boils above 900° F. (482° C.). For example, a specific type of residua which may advantageously be treated is residua derived from Arabian Light crude having the following properties:

| Initial Boiling Point, °F. (°C.) | 500 (260) | 850 (454) | 1000 (538) |
|---|---|---|---|
| Gravity, °API | 19.8 | 11.7 | 8.0 |
| Specific Gravity, 60/60° F. | 0.9352 | 0.9881 | 1.0143 |
| Pour Point, °F. | — | 55 | 80 |
| Viscosity at 212° F. | — | 109.13 | 615.8 |
| Sulfur, Wt % | 2.89 | 3.56 | 4.02 |
| Carbon Residue, (CCR) Wt % | 4.9 | 11.6 | 16.7 |
| Nickel and Vanadium Content, ppm | 23 | 43 | 80 |

The present invention may also be utilized, for example, to upgrade cut petroleum distillate to low pour point middle distillates in processes of the type described in U.S. Pat. No. 4,089,775. The process is effective in treating feedstocks having a sulfur content of at least 1%. The present process is further characterized in that it is adapted to treat a feedstock that is completely distillable, and in that it converts less than 15% of the feedstock to lighter materials, e.g., 330° F. (165° C.) boiling materials.

Preferred Embodiments

The process of this invention will now be illustrated with reference to FIGS. 1–3.

Figure 1:
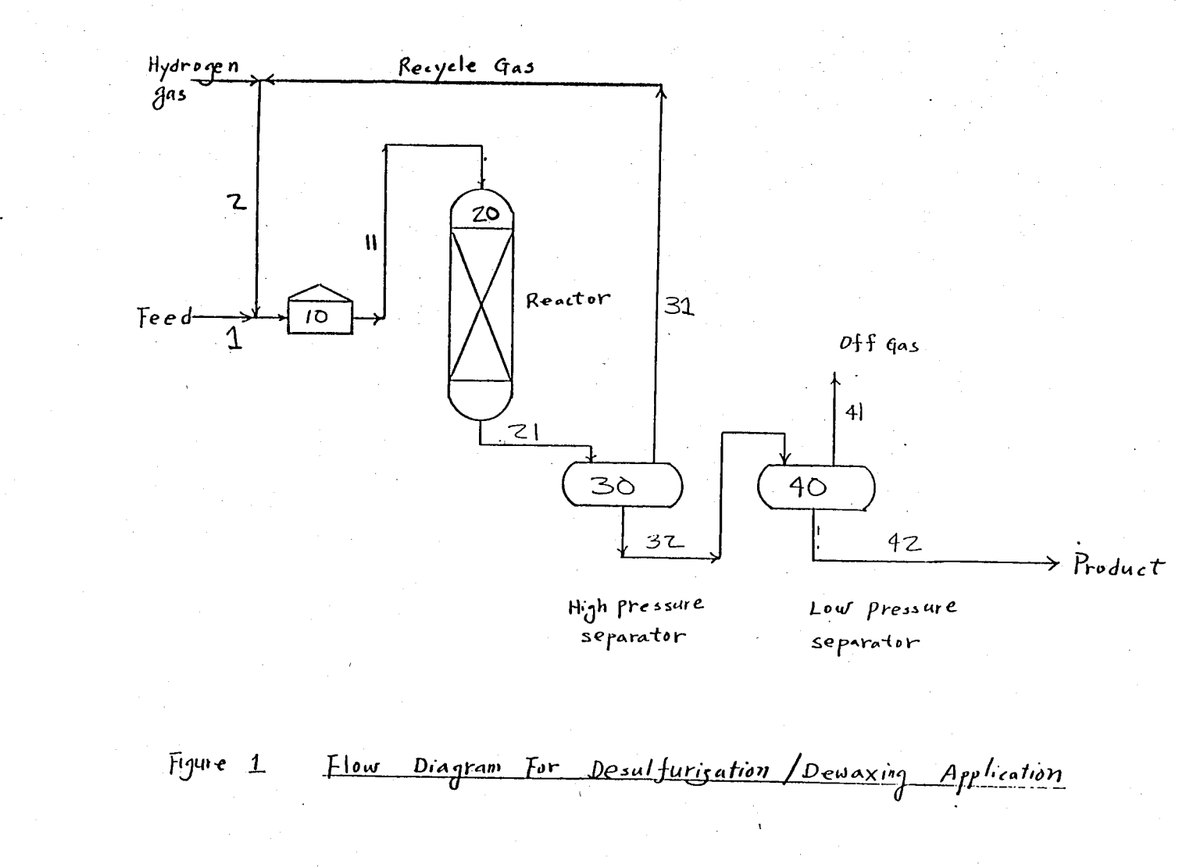
FIG. 1 is a flow diagram of a single stage desulfurization, denitrogenation and dewaxing process utilizing the catalyst of the present invention.

FIG. 1 illustrates a flow diagram for a desulfurization, denitrogenation and dewaxing process in which the feed, which may be any distillable petroleum based stock, such as vacuum gas oil, is introduced by line 1 with hydrogen via line 2 to furnace 10 and preheated to a desired processing temperature. The heated stock is then passed via line 11 to reactor 20. Reactor 20 includes a catalytic hydrocracking zone, comprising the catalyst of the present invention, at conditions effective to convert in a single pass about 15% of the feed to materials boiling below the initial boiling point of the feed. The effluent from reactor 20, including excess hydrogen, will be contaminated with free hydrogen sulfide and ammonia, since the reactor step, in addition to saturating aromatic compounds, is also accompanied by desulfurization, denitrogenation and dewaxing. The effluent from reactor 20 is passed via line 21 to a high pressure gas-liquid separator 30, wherein the effluent is separated from contaminated hydrogen. The contaminated hydrogen exits separator 30 via line 31 and is recycled to line 2 for addition to the feedstock at line 1. The effluent in separator 30 is passed via line 32 to low pressure separator 40, wherein off gases are removed via line 41. The final product exits low pressure separator via line 42. The process of FIG. 1 is advantageous in that it allows the distillation end point of the feedstock to extend above 650° F., and thus produces a low pour point distillate product.

Figure 2:
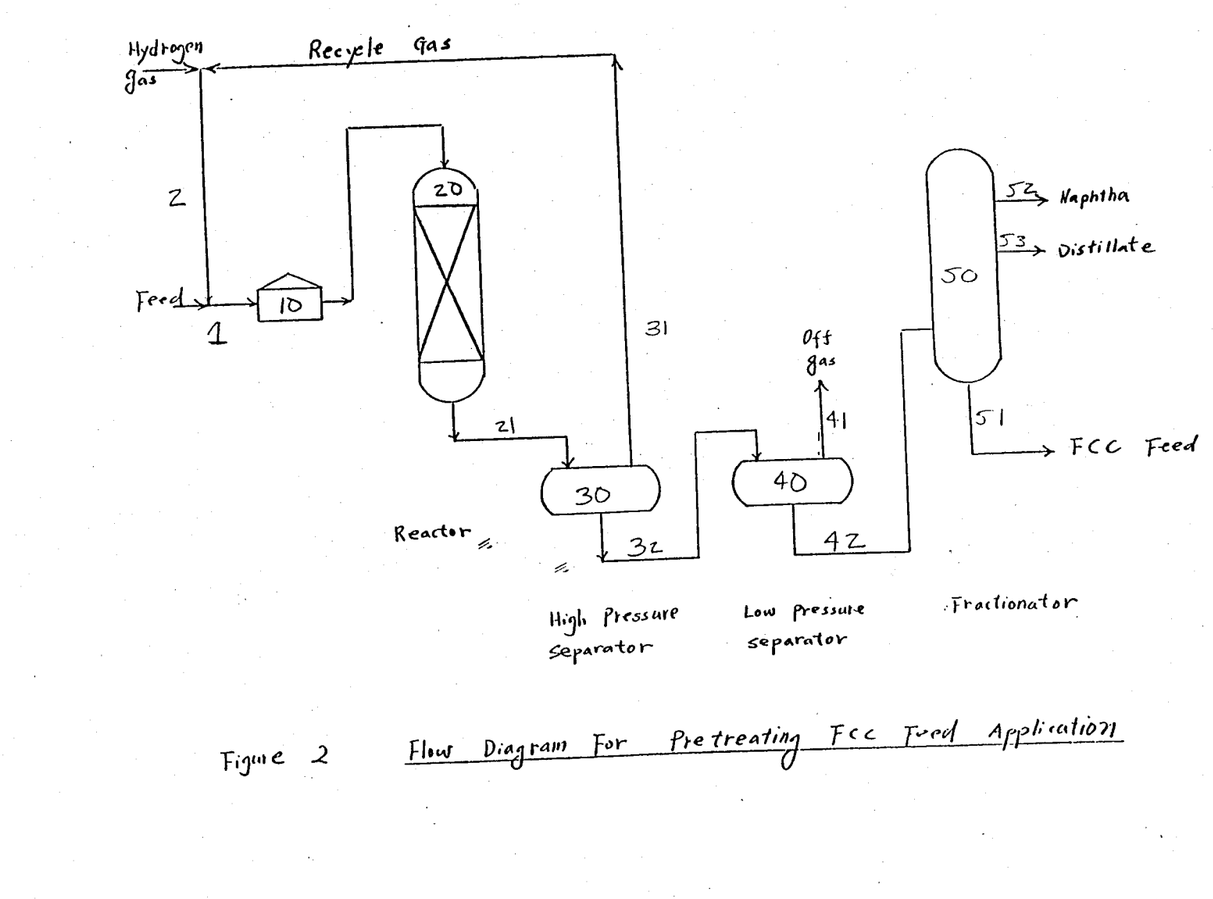
FIG. 2 is a flow diagram of a single stage process utilizing the catalyst of the present invention.

FIG. 2 illustrates the upgrading of a distillable petroleum base stock to an FCC feedstock. The process is primarily the same as that illuminated in FIG. 1, with the exception that the product of low pressure separator 40 is passed via line 42 to fractionator 50 which separates out the FCC feedstocks, via line 51, from other products such as naphtha, via line 52, and distillates, via line 53. The process of FIG. 2 is advantageous in that it produces a low pour distillate and a hydrotreated feedstock for FCC feed application.

Figure 3:
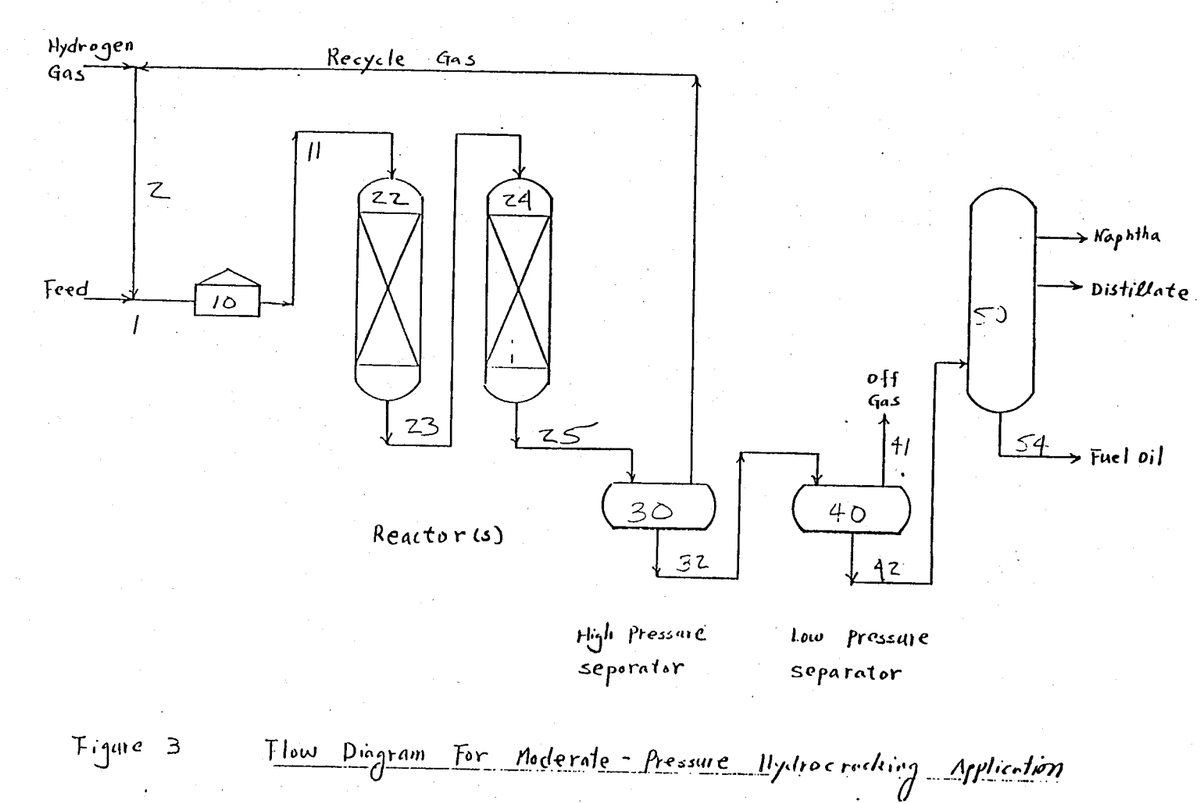
FIG. 3 is a flow diagram of a moderate-pressure hydrocracking process utilizing the catalyst of the present invention.

FIG. 3 illustrates a flow diagram for a moderate-pressure hydrocracking process in which the feedstock follows primarily the same route as that disclosed in FIGS. 1 and 2, with the exception that the reactor step comprises catalytic dewaxer reactor 22 and catalytic hydrodesulfurization reactor 24. The preheated hydrogenated feedstock enters catalytic dewaxer reactor 22 and is catalytically dewaxed under moderate pressure by the catalyst of the present invention. The effluent from catalytic dewaxer 22 is then passed via line 23 to catalytic hydrodesulfurization reactor 24, where the sulfur is separated out. The effluent from reactor 24 passes to high pressure separator 30 via line 25, and the process of FIG. 2 is continued until the effluent reaches fractionator 50. At this point, fuel oil is separated from the effluent via line 54. The process of the present invention improves the said operations by allowing the process to be conducted at less severe operating conditions than disclosed in the prior art.

COMPARATIVE EXAMPLES

Simultaneous dewaxing/desulfurization of Arab Light atmospheric resid, using a single catalyst containing hydrotreating components supported on controlled pore size alumina and ZSM-5, has been demonstrated under conventional resid desulfurization conditions, that is, 2000 psig. See U.S. Pat. Nos. 4,452,691 and 4,440,630. Controlled pore size alumina is also described in U.S. Pat. No. 4,328,127, which is hereby incorporated by reference. The product contained a low sulfur, low pour point, that is, −45° F. (−43° C.), 650° to 775° F. (343°–413° C.) fraction that could be added to refinery distillate. However, the kinematic viscosity of the 775° F.+ (413° C.+) bottom fraction at 122° F. (50° C.) was almost doubled, from approximately 313 to approximately 580 centistokes, making it unsuitable for No. 6 fuel oil use. This is shown in Table 2 below:

TABLE 2

| | Product Quality | | | |
|---|---|---|---|---|
| Catalyst Identification | Charge 1 | Charge 2 | 0 wt % ZSM-5 | 15 wt % ZSM-5 |
| Catalyst Identification | Charge 1 | Charge 2 | | |
| A. Pour Point, °F. (°C.) | | | | |
| 380–650 (193–343) | −15 (−26) | 5 (−15) | 10 (−12) | −85 (−54) |
| 650–775 (343–413) | 60 (16) | 60 (16) | 60 (16) | −45 (−43) |
| 775+ (413+) | 45 (7) | 70 (21) | 30 (−1) | 20 (−6) |
| B. Kinematic Viscosity 122° F. (50° C.), cs 775° F.+ (41° C.+) | 700 | 700 | 313 | 580 |

Charge 1 is feedstock for 15 wt % ZSM-5 catalyst.
Charge 2 is feedstock for 0 wt % ZSM-5 catalyst.

The Table shows three fractions for the feedstock. The first fraction having a boiling point between 380° to 650° F. (193°–343° C.), the second fraction having a boiling point between 650° to 775° F. (343°–413° C.), and the third fraction having a boiling point above 775° F. (413° C.). These fractions show pour points greater than about 20° F. (−6° C.) and a kinematic viscosity for the third fraction greater than 500 centistokes. Such physical properties for the product renders it unsuitable for many uses, because it is very difficult to use having such characteristics, including use for No. 6 fuel oil.

The pour point reductions of the 380° to 650° F. (193°–343° C.) fraction and the 650° to 775° F. (343°–413° C.) fraction were much more than required by typical product specifications. Furthermore, the distillate yield could be improved, as shown by the data, if the over-hydrocracking of paraffin by ZSM-5 to light gases in gasoline could be avoided.

Because Zeolite Beta is more distillate selective than ZSM-5 zeolite in the conversion of vacuum gas oil range materials, Zeolite Beta is a preferred component of the catalyst. This effect is shown in Table 3. This fact is shown by the yields of 66.1 wt % using a platinum Zeolite Beta catalyst and the yield of 59.2 wt % using ZSM-5 zeolite catalyst for a 330° to 650° F. (165°–343° C.) fraction for the distillate.

TABLE 3

| | Charge 3* | Pt—Zeolite Beta, Wt % | ZSM-5, Wt % |
|---|---|---|---|
| Temperature, °F. (°C.) | — | 556 (291) | 557 (292) |
| Pressure, psig | — | 1350 | 1350 |
| Space Velocity, LHSV | — | 2.0 | 2.4 |
| H$_2$ Circulation, SCF/B | — | 4000 | 4000 |
| C$_1$–C$_4$ Wt % | — | 1.0 | 5.1 |
| C$_5$–330° F. (166° C.) Naphtha | 1.6 | 17.1 | 15.5 |
| 330°–650° F. (166–343° C.) Distillate | 61.7 | 66.1 | 59.2 |
| 650° F.+ (343° C.+) | 26.7 | 16.9 | 20.2 |
| 330° F. (166° C.) Pour Point, °F. (°C.) | +40 (+4) | +5 (−15) | +15 (−9) |

*Severely Hydrotreated 400°–700° F. (204–371° C.) Feed

On the other hand, amorphous NiW/SiAl component is also a desirable component, because it has higher cracking activity for converting polynuclear aromatic components heavier than 700° F. The nickel tungsten component can also be cobalt molybdenum or nickel molybdenum. See U.S. Pat. No. 3,702,818, incorporated herein by reference, and the T. Y. Yan article.

EXAMPLES

This invention will now be illustrated by examples, which are not to be interpreted as limiting the scope thereof, the scope being set forth in the specification, including the appended claims; all parts and proportions are by weight unless explicitly stated to be otherwise.

EXAMPLE 1

The chargestock used is Arab Light atmospheric resid. Its properties are listed in Table 4.

TABLE 4

| Catalyst* | Feed | 1 | 2 | 3 | 4 | 5 |
|---|---|---|---|---|---|---|
| Pour Point, °F. (°C.) | | | | | | |
| 380–650 (193–343) | −15 (−26) | −15 (−26) | −15 (−16) | 0 (−18) | −5 (−20) | −40 (−40) |
| 650–775 (343–413) | 45 (7) | 45 (7) | 35 (2) | 45 (7) | 50 (10) | 10 (−12) |
| 775+ (413+) | 65 (18) | 80 (27) | 40 (4) | 70 (21) | 45 (7) | 20 (−7) |
| Kinematic Viscosity 122° F. (50° C.), cs 775° F.+ (413° C.) | 500 | 230 | 230 | 160 | 190 | 270 |
| Conversion, Wt % 775° F.+ (413° C.+) | — | 7 | 4 | 12 | 6 | 6 |
| Liquid Product Distribution, Wt % | | | | | | |
| Initial Boiling Point | 0.7 | 0.9 | 1.6 | 0.7 | 1.3 | 1.8 |
| 380–775° F. (193–413° C.) | 27.1 | 32.2 | 28.9 | 30.8 | 38.7 | 30.2 |
| 775° F.+ (413° C.+) | 72.1 | 66.9 | 69.5 | 68.5 | 62.6 | 68.1 |

*Catalyst descriptions are given in Table 5.

The experiment is carried out in a fixed bed reactor at 800 psig, 725° F. and 0.5 WHSV space velocity.

TABLE 5

Catalyst 1: Hydrotreating catalyst, containing 3.5 wt % nickel oxide and 15 wt % molybdenum oxide supported on 100 wt % alumina of controlled pore-size.
Catalyst 2: Zeolite containing hydrotreating catalyst, containing 3.5 wt % nickel oxide and 15 wt % molybdenum oxide supported on 85 wt % alumina and 15 wt % ZSM-5.
Catalyst 3: Same as Catalyst 2, except ZSM-5 is replaced by Zeolite Beta.
Catalyst 4: Hydrotreating catalyst, containing 4 wt % Ni and 10 wt % W supported on 100 wt % SiAl.
Catalyst 5: Physical mixture of equal proportions of catalysts 2, 3 and 4.

It is shown in Table 4 that the pour point reduction by Catalyst Nos. 1–4, containing hydrotreating components on controlled pore size alumina and only one zeolite component, or SiAl alone, are insufficient. The composite Catalyst No. 5, containing equal proportions of Catalyst Nos. 2–4, shows significant pour point reductions meeting typical product specification, that is, less than about 20° F. (−7° C.) pour point. Furthermore, the kinematic viscosity of the 775° F.+ (413° C.+) fraction is less than about 500 centistokes, making it suitable for No. 6 fuel oil application. It is also observed that the total distillate yield is higher for Catalyst Nos. 3–5 than Catalyst No. 2 (that is, containing 15 wt % ZSM-5 zeolite), even though Catalyst Nos. 3 and 4 have insufficient pour point reduction activities under the reaction conditions. Thus, the present invention permits increase in the quality of distillate yield while maintaining the quality of the fuel oil fraction, which hitherto has not been achieved in the prior art.

EXAMPLE 2

A catalyst sample was prepared by extruding a mixture of Zeolite Beta in ammonium form and Catapal SB alumina. The Zeolite Beta utilized had a silica:alumina ratio of 40:1, a residual sodium content of 0.02 wt % and an alpha activity of 500; the Zeolite Beta was calcined, but was not steamed. The extrudate was then dried and calcined at 1000° F. (538° C.) to form a base containing 10 wt % of Zeolite Beta and 90 wt % of $Al_2O_3$. The calcined extrudate was then impregnated with ammonium heptamolybdate, dried, and then impregnated with nickel nitrate. The metal-impregnated catalyst was then calcined at 1000° F. to form a catalyst containing 3.5 wt % NiO and 10 wt % $MoO_3$, based on total catalyst weight. The catalyst particles and the properties of a commercially available resid hydrodesulfurization catalyst (HDS-1441, manufactured by American Cyanamid) are listed below:

| | Catalyst Properties | |
|---|---|---|
| Catalyst | Example 1 | Commercial HDS-1441 |
| $MoO_3$, Wt % | 10 | 11 |
| NiO, Wt % | 3.5 | — |
| CoO, Wt % | — | 3.4 |
| Surface Area, $m^2/g$ | 206 | 270 |
| Pore Volume, cc/g ($N_2$ Method) | 0.494 | 0.542 |
| Avg. Pore Diameter, Å | 96 | 80 |
| Pore Size Distribution % Volume in Pores of | | |
| 0–30Å Diameter | 20 | 14 |
| 30–50Å | 5 | 12 |
| 50–80Å | 42 | 73 |
| 80–100Å | 13 | 1 |
| 100–150Å | 1 | 0 |
| 150–200Å | 1 | 0 |
| 300+ Å | 18 | 0 |

EXAMPLE 3

A Lagomedio atmospheric resid was hydroprocessed in a shaker bomb unit utilizing the catalyst from Example 2. This resid had the following properties prior to treatment:

| Initial Boiling Point, °F. (°C.) | 500 (260) |
|---|---|
| Gravity, °API | 18.1 |
| Specific Gravity, 60/60° F. | 0.9459 |
| Pour Point, °F. (°C.) | 75 (24) |
| Sulfur, Wt % | 1.99 |
| Carbon Residue (CCR), Wt % | 7.81 |
| Nickel Content, ppm | 21 |
| Vanadium Content, ppm | 220 |

The process conditions utilized were as follows:

| Lagomedio Atmospheric Resid, g | 300 |
|---|---|
| Catalyst, g | 15 |
| Temperature, °F. (°C.) | 750 (400) |
| Hydrogen Pressure, psig | 2000 |
| Reaction Time, min | 80 |

The results of the hydroprocessing are set forth below, along with the results obtained utilizing the commercially available resid hydrosulfurization catalyst HDS-1441 under the same process conditions as above.

|  | Charge Stock | Catalyst From Example 1 | Commercial Catalyst HDS-1441 |
|---|---|---|---|
| Sulfur Content, Wt % | 1.99 | 1.00 | 0.97 |
| Pour Point, °F. (°C.) | 75 (24) | 46 (7) | 60 (15) |

EXAMPLE 4

A second Lagomedio atmospheric resid was treated in a shaker bomb unit utilizing the catalyst from Example 2, under the process conditions set forth in Example 3. The resid had the following properties prior to treatment:

| Initial Boiling Point, °F. (°C.) | 500 (260) |
|---|---|
| Gravity, °API | 18 |
| Sulfur, Wt % | 2.12 |
| Carbon Residue (CCR), Wt % | 7.29 |
| Nickel Content, ppm | 22 |
| Vanadium Content, ppm | 235 |

The results obtained with the catalyst of the present invention and the commercially available prior art catalyst identified in Example 3 are set forth below:

|  | Charge Stock | Catalyst From Example 1 | Commercial Catalyst HDS-1441 |
|---|---|---|---|
| Total Liquid Product (TLP) |  |  |  |
| Vanadium, ppm | 235 | 95 | 124 |
| Sulfur, Wt % | 2.12 | 1.054 | 1.13 |
| CCR, Wt % | 7.29 | 5.89 | 5.23 |
| Removals, % |  |  |  |
| Vanadium | — | 59.6 | 47.2 |
| Sulfur | — | 50.4 | 46.8 |
| CCR | — | 19.2 | 28.3 |

EXAMPLE 5

A catalyst composition having 3% NiO and 15% MoO₃, based on total catalyst, impregnated on a support of 15% unsteamed Zeolite Beta (SiO₂/Al₂O₃=32) and 85% Al₂O₃, based on the combined weight of Zeolite Beta and Al₂O₃, was prepared as follows: 175 grams of 1/16" diameter, calcined 15% Zeolite Beta-85% Al₂O₃ extrudate were impregnated to incipient wetness with 127 ml of ammonium heptamolybdate solution, dried at 250° F. and re-impregnated with 109 ml of nickel(ous) nitrate solution. The product was dried and then calcined in flowing air for 3 hours at 1000° F. The Zeolite Beta in the calcined extrudate was considered to be in the H+ form and had an alpha activity of 358.

The alumina utilized was a particular alumina powder identified as PA alumina, a product of American Cyanamid Company.

EXAMPLE 6

A conventional catalyst composition having 3% NiO and 15% MoO₃ impregnated on a PA alumina support was prepared as follows: 93.5 grams of 1/16" diameter, calcined 100% alumina cylinders were impregnated to incipient wetness with 71 ml of ammonium molybdate solution, dried at 250° F. (121° C.), and the reimpregnated with 61 ml of nickel(ous) nitrate solution. The product was dried at 250° F. (121° C.) and then calcined in flowing air for 3 hours at 1000° 1 F. (538° C.).

A comparison of the physical properties of the catalyst prepared in Example 5 with those of the catalyst prepared in Example 3 is set forth in Table 6 below.

TABLE 6

| Property | Catalyst Example 5 | Catalyst Example 6 |
|---|---|---|
| Density (g/cc) |  |  |
| Packed | 0.70 | 0.74 |
| Particle | 1.20 | 1.22 |
| Real | 3.40 | 3.95 |
| Pore Volume, cc/g | 0.538 | 0.566 |
| Surface Area (m²/g) | 298 | 242 |
| Average Pore Diameter (Å) | 72 | 94 |
| Pore Size Distribution (PSD) |  |  |
| % of Pore Volume in Pores of |  |  |
| 0–30 (Å) Diameter | 10 | 11 |
| 30–50 | 11 | 6 |
| 50–80 | 44 | 29 |
| 80–100 | 28 | 43 |
| 100–150 | 3 | 8 |
| 150–200 | 1 | 1 |
| 200–300 | 1 | 0 |
| 300+ | 2 | 2 |

EXAMPLE 7

The catalyst compositions described in Examples 5 and 6 above were compared as follows. The catalysts were evaluated for hydrotreating vacuum gas oil (VGO) in a batch shaker bomb unit. The VGO characteristics are listed below. The test conditions utilized are set out as follows:

| VGO, g | 150 |
|---|---|
| Catalyst, g | 20 |
| Temperature, °F. (°C.) | 710 (377) |
| Pressure (Hydrogen), psig | 1000 |
| Reaction Time, min | 100 |

The liquid product was topped to yield a 650° F.+ (343° C.) fraction for analysis. The results of the analysis were as follows:

|  | Charge | Catalyst Example 5 | Example 6 |
|---|---|---|---|
| Nitrogen, ppm | 830 | 350 | 400 |
| Sulfur, Wt % | 2.34 | 0.415 | 0.435 |
| Pour Point, Wt % | 100 | 70 | 95 |
| Boiling Range, °F. (°C.) | | | |
| at 1 | 555 (291) | 670 (354) | 624 (329) |
| 5 | 623 (328) | 703 (373) | 657 (347) |
| 25 | 744 (396) | 774 (412) | 743 (395) |
| 50 | 837 (447) | 847 (453) | 825 (441) |
| 95 | 1030 (554) | 1020 (549) | 1008 (542) |
| Reductions | | | |
| % Denitrogenation | — | 58 | 52 |
| % Desulfurization | — | 83 | 82 |
| Pour Point Lowering, °F. | | 30 | 5 |

The above results demonstrate that the catalyst of Example 5, containing Zeolite Beta, provided excellent denitrogenation and desulfurization, and also reduced the pour point by 30° F. In contrast, the conventional catalyst of Example 6 gave good denitrogenation and desulfurization, but only produced a minimal reduction in pour point. Both of these catalysts had pore size distributions such that about 90% of the pore volume of these catalysts was in pores smaller than 100 Angstrom units in diameter.

Thus, the catalyst compositions contemplated in this application are composite catalysts containing hydrotreating components supported on controlled pore size alumina, and at least two other zeolitic components selected from any of intermediate pore size zeolites, large pore zeolites or Zeolite Beta, or a large pore size non-zeolitic material, such as amorphous SiAl. Applicants have discovered that a catalyst system which includes a hydrogenation component impregnated on a support, preferably comprising a minor portion of Zeolite Beta and a major portion of an inorganic oxide, is capable of simultaneously hydrotreating and dewaxing a heavy feedstock, such as vacuum gas oil in a single stage process.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process comprising the steps of simultaneous demetallating, hydrodesulfurizing and dewaxing petroleum residua at least 50% of which boils above 750° F. by contacting said residua with a catalyst, comprising:
   (a) a hydrogenation/dehydrogenation component supported on catalytically active alumina, said alumina having a controlled pore size whereby said catalyst has 75% of its pore volume in pores no greater than 100 Angstrom units in diameter, and about 20% of its pore volume in pores greater than about 300 Angstrom units in diameter; and
   (b) an intermediate pore zeolite, and zeolite beta as a large pore component and a large pore non-zeolitic inorganic binder.

2. The process according to claim 1, wherein said hydrogenation/dehydrogenation component includes a catalytically effective amount of at least one metal selected from Group VIB and Group VIII of the Periodic Table.

3. The process according to claim 2, wherein said intermediate pore zeolite is ZSM-5.

4. The process according to claim 3, wherein said non-zeolitic inorganic binder comprises amorphous silica-alumina.

5. The process according to claim 1, further comprising recovering an upgraded petroleum product characterized by fractions having pour points less than about 20° F. and by kinematic viscosity less than about 500 centistokes.

6. The process according to claim 1, further comprising reacting the catalyst at pressures between about 200 and about 3000 psig, temperatures between about 600° and about 900° F., and a space velocity between about 0.1 and about 10 LHSV.

7. The process according to claim 2, in which said catalyst comprises 5 to 50 wt % of said Zeolite Beta and 95 to 50 wt % of alumina.

8. The process according to claim 7, wherein said intermediate pore zeolite is selected from the group having the structure of ZSM-5, ZSM-11, ZSM-12, ZSM-22, ZSM-23, ZSM-34, ZSM-35, ZSM-38, ZSM-48, TMA Offretite, Clinoptilolite and Erionite.

9. The process of claim 7, wherein the hydrogenation/dehydrogenation component includes 1 to 10 wt % of said Group VIII metal and 5 to 20 wt % of said Group VIB metal, based on total catalyst weight and expressed in elemental form.

10. The process of claim 9, wherein the contacting is carried out in the presence of hydrogen gas at a total pressure of about 500 to 3000 psig, a temperature of about 600° to 850° F., and a liquid hourly space velocity of 0.1 to 5, based on the total complement of catalysts in the system.

11. The process of claim 9, wherein said Group VIII metal comprises nickel and said Group VIB metal comprises molybdenum.

12. The process of claim 9, wherein said Group VIII metal comprises 2 to 10 wt % nickel oxide and said Group VIB metal comprises 5 to 20 wt % molybdenum oxide.

13. A process according to claim 1 for hydrodesulfurization, demetallizing and dewaxing petroleum residua, which process comprises contacting the residua, at least 50% of which boils above 750° F., with a catalyst comprising 5 to 50 wt % Zeolite Beta and 95 to 50 wt % alumina, based on the combined weight of Zeolite Beta and alumina, ZSM-5, and 10 to 25 wt %, based on total catalyst weight, of nickel oxide in an amount of 2 to 10 wt % and molybdenum oxide in an amount of 5 to 20 wt %, said catalyst having 75% of its pore volume in pores no greater than 100 Angstrom units in diameter and about 20% of its pore volume in pores greater than about 300 Angstrom units in diameter, said contacting being carried out in the presence of hydrogen gas at a total pressure of about 500 to 3000 psig, a temperature of about 600° to 850° F. and a liquid hourly space velocity of 0.1 to 10, based on the total complement of catalyst in the system.

* * * * *